US007830750B2

(12) United States Patent
Smith

(10) Patent No.: US 7,830,750 B2
(45) Date of Patent: Nov. 9, 2010

(54) APPARATUS AND METHOD FOR CALIBRATING AN ACOUSTIC DETECTION SYSTEM

(75) Inventor: Richard A. Smith, El Dorado Hills, CA (US)

(73) Assignee: Honeywell International Inc., Morristown, NJ (US)

( * ) Notice: Subject to any disclaimer, the term of this patent is extended or adjusted under 35 U.S.C. 154(b) by 168 days.

(21) Appl. No.: 11/856,235

(22) Filed: Sep. 17, 2007

(65) Prior Publication Data

US 2009/0073803 A1 Mar. 19, 2009

(51) Int. Cl.
*G01S 3/80* (2006.01)

(52) U.S. Cl. ...................................................... 367/128

(58) Field of Classification Search ............ 367/87–191
See application file for complete search history.

(56) References Cited

U.S. PATENT DOCUMENTS 4,401,976 A * 8/1983 Stadelmayr ................. 340/522
5,341,122 A 8/1994 Rickman
5,524,099 A * 6/1996 Rickman et al. .............. 367/13
7,057,497 B2 * 6/2006 Sakai .................... 340/426.27
2005/0264413 A1 * 12/2005 Eskildsen .................. 340/522

* cited by examiner

*Primary Examiner*—Thomas H Tarcza
*Assistant Examiner*—Luke D Ratcliffe
(74) *Attorney, Agent, or Firm*—Husch Blackwell Sanders Welsh & Katz

(57) ABSTRACT

A system and method for calibrating an acoustic detector. The method includes the steps of simultaneously transmitting an acoustic signal and an electromagnetic signal to an acoustic detector, receiving both signals, calculating a timing difference between the reception of the acoustic signal and electromagnetic signal, and setting a first time threshold used to determine if a glass panel is broken using the calculated difference and storing the first time threshold. A sensitivity level is also set based upon the determined timing difference. A unique key signature in the acoustic signal and electromagnetic signal is detected and matched with a stored signature to determine whether the signals are from a calibration signal. The timing difference is only calculated if both signals are calibration signals.

19 Claims, 6 Drawing Sheets

APPARATUS AND METHOD FOR CALIBRATING AN ACOUSTIC DETECTION SYSTEM

BACKGROUND OF THE INVENTION

1. Field of the Invention

The present invention relates generally to glass breakage detection, communication devices, and security systems. More particularly, the invention pertains to an apparatus and method for calibrating a glass breakage detection system that includes an impact sensor mounted on the glass window or door to detect a physical/mechanical impact to the glass window or door and an acoustic sensor for confirming that the glass is broken by detecting a sound of breaking glass of a glass window within a predetermined time period. An alarm is only generated if both detections occur within the time period.

2. Discussion of the Prior Art

The present invention addresses the commercial problem of a security system, such as a commercial or residential/home security system, providing a glass breakage sensor for detecting an intrusion into a protected space through a glass window or door. Acoustic detectors are commonly used to detect and indicate attempts to break into a premises by breaking glass objects. The detector generates an alarm signal when the sound of breaking glass windows or glass doors is detected. Typically, the detectors are remotely mounted from the protected glass and are attached to a ceiling or a wall. The location of the detector is dependent on the size of the protected area.

The detectors rely on detecting the sound of breaking glass by sensing one or more known frequency components associated with the sound of breaking glass. When the glass break detector is installed, it is typically tested to ensure proper functionality. The detection is tested such that the acoustic properties of the environment are compensated for by a sensitivity adjustment to optimize the sensing range of the detector. However, even with this adjustment, false alarms can be generated by sounds other than those of breaking glass from a glass window or door that can fool the audio processor and cause the issuance of a false alarm by the security system. Some examples of sounds that can fool the audio processor and cause the issuance of false alarms include sounds of a barking dog, the popping of a balloon, a dropping of a pot or pan, an accidental dropping and breakage of a drinking glass, and the closing of a kitchen cabinet.

To avoid false alarms an impact detector is used to detect vibrations on a window. An alarm is only generated if both the acoustic sensor detects the sound of breaking glass and an impact sensor on the glass window or door detects a physical/mechanical impact to the glass window or door. Still false alarms can be generated if both sensors detect an "event", but the detection is separated by a period of time. Further the time between the detection of the impact and the detection of the breaking glass will vary dramatically in different environments, temperatures, altitudes and size of a premise.

Additionally, various common objects found in an indoor location can negatively affect the performance of the detector and time between the detection, such as carpet, ceiling tiles, walls or floors, due to the reflection and absorption of frequency components.

Current detectors either have no sensitivity adjustment or a sensitivity adjustment which is set by an installer. When an installer manually adjusts the sensitivity, the adjustment can still be incorrect. To adjust the level of sensitivity of the detector, an installer needs to open the detector each time the level must be changed. In practice, the sensitivity adjustment occurs multiple times, requiring the installer to manually adjust the sensitivity each time by changing a setting inside the detector. With the current setting method, the environmental characteristics are not optimized for detection, which results in false alarms.

Accordingly, there is a need for an apparatus and method for calibrating a glass break detection system that will reduce false alarms and optimize a detection range for its environment.

SUMMARY OF THE INVENTION

Disclosed is a method and system for calibrating an acoustic detection system. The method comprises the steps of simultaneously transmitting an acoustic signal and an electromagnetic signal to an acoustic detector, receiving the electromagnetic signal and the acoustic signal, calculating a timing difference between the reception of the acoustic signal and electromagnetic signal and storing the calculated timing difference as a first time threshold for determining if a glass panel is broken.

A preset tolerance value can be added to the calculated timing difference to adjust for the environment. The new timing difference is then stored as a second time threshold. The method also includes the steps of converting the calculated timing difference into a distance vector and setting a detection threshold for a sensing element that corresponds to the distance vector. A preset tolerance distance can be added to the distance vector to generate an adjusted distance vector. The adjusted distance vector is used to read out the detection threshold from a table that corresponds to the adjusted distance vector.

The method further includes the step of detecting a unique key signature in the acoustic signal and the electromagnetic signal to determine whether the signals are calibration signals. The timing difference is only calculated if both signals are calibration signals. In another embodiment, the method includes the step of detecting a unique key signature in the acoustic signal to determine whether the signal is a calibration signal. The timing difference is only calculated if the acoustic signal is a calibration signal.

The electromagnetic signal can be any type of electromagnetic signal such as, but not limited to a RF frequency signal, an infrared signal, or a visible light signal.

Also disclosed is a calibration device for calibrating an acoustic detection system. The calibration device comprises an acoustic signal generating section for generating an acoustic signal having a unique signature corresponding to the calibration device, a speaker for transmitting the acoustic signal to an acoustic detector; a signal generating section for generating a electromagnetic signal having a second unique signature corresponding to the calibration device; and a transmitter for simultaneously transmitting the electromagnetic signal to the acoustic detector.

The calibration device further comprises a control section for controlling the acoustic signal generating section, the speaker, the signal generating section and transmitter based upon the user input. The control section causes the speaker and transmitter to simultaneously transmit the acoustic signal and the electromagnetic signal to the acoustic detector.

The control section includes a processor for controlling functionality of the calibration device, a memory for storing the unique signature and digitized pulses of the acoustic signal and a clock for maintaining an internal timing. The clock allows the control section to cause the speaker and transmitter to simultaneously transmit the acoustic signal and the electromagnetic signal to the acoustic detector.

Also disclosed is an acoustic detector. The acoustic detector comprises a sensor for detecting an acoustic signal, a receiver for detecting a electromagnetic signal, a timer for recording a reception time for the electromagnetic and acoustic signals, a calculating section for determining a timing difference between the reception times of the electromagnetic signal and the acoustic signal and a controller for storing the timing difference as a first time threshold for determining if a glass panel is broken. The controller only stores the timing if a unique signature is detected in the acoustic signal. The timer records the reception time upon receipt of a leading edge the electromagnetic signal and leading edge of a first pulse in the acoustic signal.

The controller converts said time differences into a distance vector and sets a detection threshold based upon the distance vector.

Also disclosed is a system for calibrating an acoustic detector. The system comprises an impact sensor for transmitting a signal to an acoustic detector and a calibration device for simultaneously emitting an acoustic signal to the acoustic detector. The acoustic detector determines the reception time for a signal and the acoustic signal, calculates a difference in the reception time and sets the difference as a first time threshold for determining if a glass panel is broken.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

Figure 1:
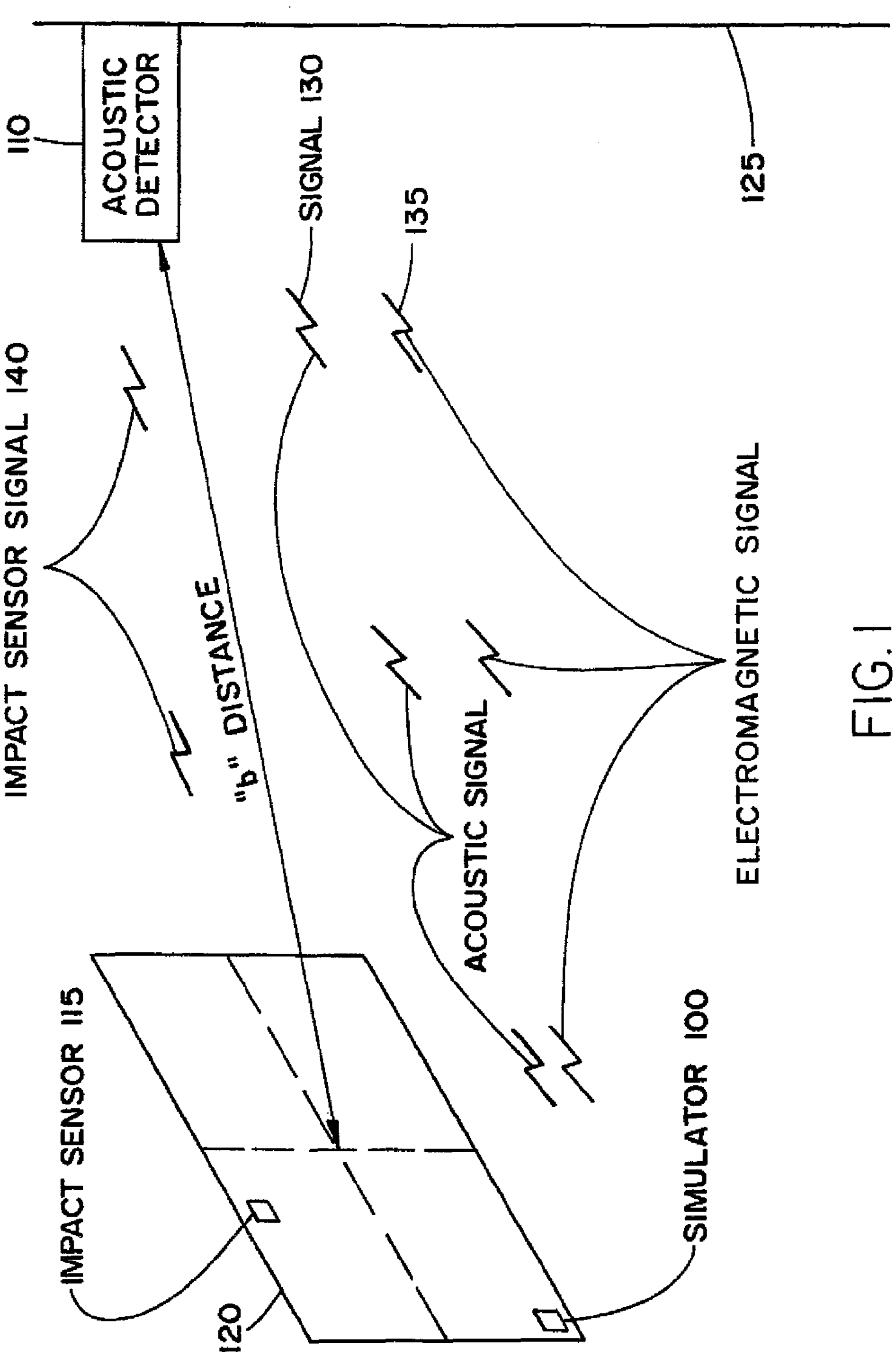
FIG. 1 illustrates a basic diagram of the glass breakage detection system and calibration system according to an embodiment of the invention.

FIG. 1 depicts the inside of a residential or commercial premises protected by the glass breakage detection system having a simulator or calibration device 100 placed in a protected glass. An acoustic detector 110 is mounted on a wall 125 of the protected premises to monitor the premises for acoustic sounds indicative of the breakage of glass. The acoustic detector 110 can also be located on a ceiling. The acoustic detector 110 is strategically placed within the premises to optimize the range of the detector from the glass, e.g., glass window 120. If there is more than one window 120, the acoustic detector 110 will be mounted centrally.

An impact sensor 115 is mounted on the glass window 120. The impact sensor 115 can also be mounted on a glass door. If the impact sensor 115 detects an impact, the impact sensor 115 transmits a wireless signal to the acoustic detector 110. The acoustic detector 110 generates an alarm if the acoustic detector detects an acoustic sound indicative of broken glass within a predetermined time threshold. The acoustic detector 110 detects an acoustic sound if the amplitude of the sound (pulses) at certain frequencies is greater than a detection threshold. The acoustic detector 110, prior to installation is programmed with a default detection threshold and time threshold.

The detection threshold and predetermined time threshold are configurable parameters that can be adjusted during installation. An installer or user can use a calibration device 100 to set the thresholds. According to the invention, these parameters are customized and optimized for each protected premises. As illustrated in FIG. 1, the acoustic detector 110 is located at “d” distance from the window 120. This distance will dramatically affect both the amplitude of the sound signal and the time difference between receipt of the sound signal and wireless signal 140 from the impact sensor 115.

Figure 2:
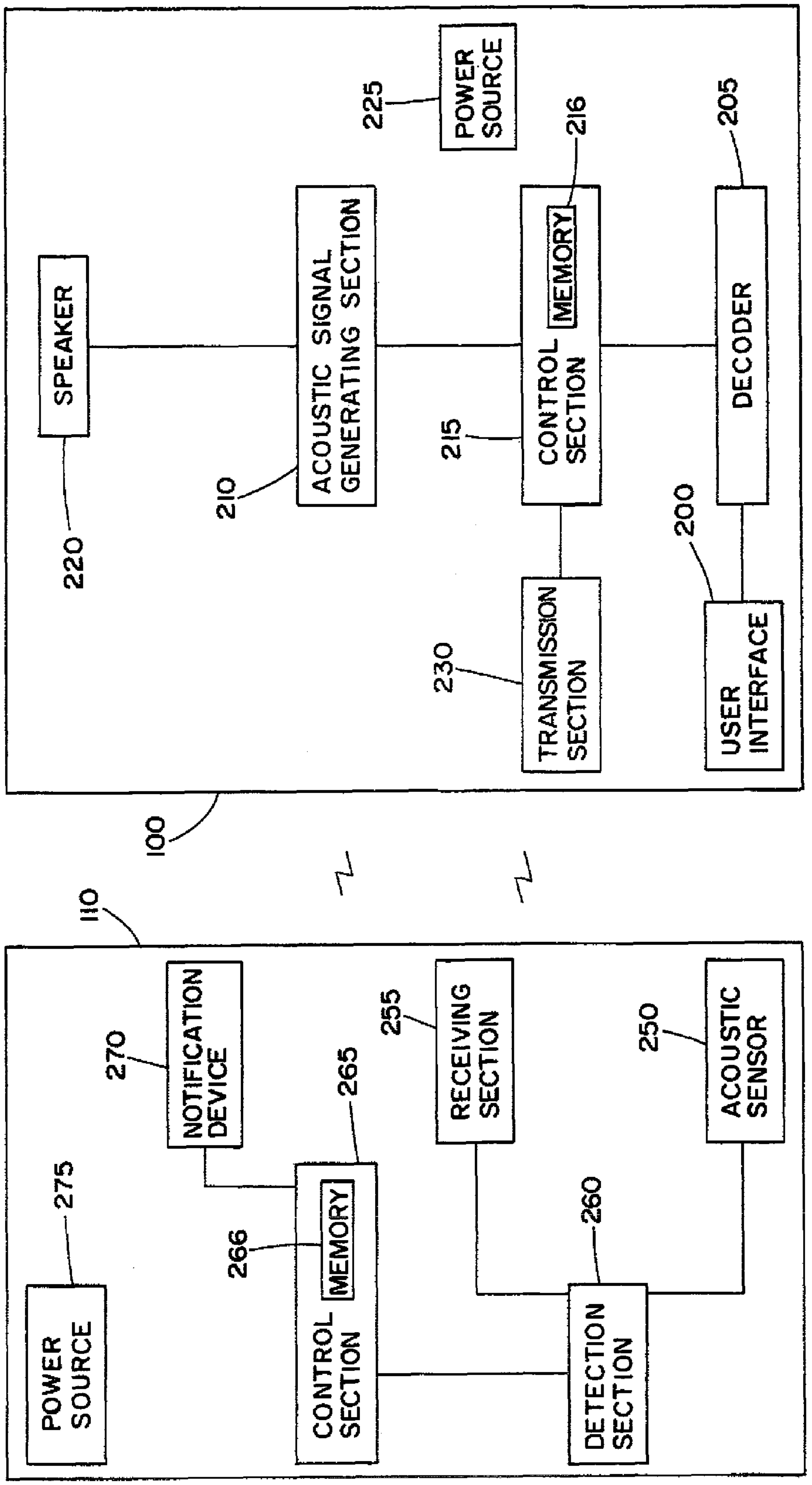
FIG. 2 illustrates a block diagram of a calibration device and an acoustic detector according to an embodiment of the invention.

FIG. 2 illustrates a block diagram of the calibration device 100 and the acoustic detector 110 according to an embodiment of the invention.

In an embodiment, the calibration device 100 can be any device capable of transmitting an acoustic signal 130 and an electromagnetic signal 135.

The calibration device 100 includes a user interface section 200 adapted to allow a user to input a control instruction. The user interface section 200 can be a DIP switch, a jog dial, or an arrow key or button. Alternatively, the user interface section 200 can be an alphanumeric keypad. The calibration device 100 also includes an interface decoder 205. The interface decoder 205 is coupled to the user interface section 200 to detect and decode the user input from the user interface section 200. For example, if the alphanumeric keypad is used as the user interface section 200, the interface decoder 205 determines which key is pressed. The interface decoder 205 can use the same process for detecting an arrow key depression.

Alternatively, if a jog dial is used, the interface decoder 205 determines a direction of revolution and magnitude based upon a relative voltage. The detection of the rotation of a jog dial is also known and will not be described.

Alternatively, if a switch is used as the user interface 200, the interface decoder 205 will detect the opening or closing of the switch or relays. In an embodiment, the user interface 200 will include one dedicated button that triggers the calibration device 100 to simultaneously emit an acoustic signal 130 and an electromagnetic signal 135.

The calibration device 100 includes a control section 215. The control section 215 controls the functionality of the calibration device 100. The control section 215 includes memory 216. The control section 215 can be a microprocessor programmed with firmware. As depicted in FIG. 2, the control section 215 and interface decoder 205 are separate, however, in another embodiment, the control section 215 and interface decoder 205 is integrated together in a micro-controller. The firmware is stored in memory 216. In the preferred embodiment, the memory 216 also includes a digitized acoustic sound, e.g., pulses of specific amplitude and frequency. The digitized acoustic sound will include a unique key signature. The unique key signature acts as an identifier for the calibration device 100. The acoustic detector 110 will know that the acoustic sound is a sound from the calibration device 100 by detecting the unique key signature. In another embodiment, memory 216 will include instruction for generating an acoustic sound and an acoustic signal generating section 210 that will generate the signal using an internal clock and a high frequency oscillator. The acoustic signal 130 is designed to simulate the sound of glass breaking. In an embodiment, memory 216 will also include a predetermined electromagnetic signal 135. The electromagnetic signal 135 is designed to simulate a wireless signal coming from the impact sensor 115. In an embodiment, the electromagnetic signal 135 will also include a unique signature.

The acoustic signal generating section 210 generates the acoustic signal 130 based on data from memory 216. The acoustic signal generating section 210 includes an amplifier to amplify the signal for transmission. The acoustic signal generating section 210 forwards the acoustic signal 130 to a speaker 220. The speaker 220 transmits the acoustic signal 130 to the acoustic detector 110.

In an embodiment, the calibration device 100 simultaneously emits an acoustic signal 130 and an electromagnetic signal 135.

The calibration device 100 also includes a power supply 225. The power supply can be a battery.

The acoustic detector 110 includes an acoustic sensor 250, electromagnetic signal receiving section 255, a signal detection section 260, a control section 265, a notification device 270, and a power source 275. The acoustic sensor 250 can be a microphone. The acoustic sensor 250 senses all acoustic sounds, including the acoustic signal 130 from the calibration device 100.

In an embodiment, the electromagnetic signal receiving section 255 receives electromagnetic signals, such as an electromagnetic signal from the calibration device 100. In another embodiment, the electromagnetic signal receiver section 255 receives the electromagnetic signal from the impact sensor 115 (which will be described later). The signal detection section 260 detects both acoustic signals and electromagnetic signals.

After the electromagnetic signal receiving section 255 detects the electromagnetic signal 135, any identification information embedded in the signal is extracted and compared with identification information stored in memory. In an embodiment, the identification information is the frequency component and amplitude of the signal. Unique key signatures for the calibration device 100 are stored in memory 315. This enables the acoustic detector 110 to determine whether the received electromagnetic signal 135 is a test signal from a calibration device 100, i.e., signal 135 or a detector signal.

As described above, an acoustic signal is detected if a pulse of the acoustic signal exceeds a predetermined detection threshold. Once the acoustic signal is detected, the signal detection section 260 determines the source of the signal by extracting a unique key signature and compares the signal with identification information stored in memory 315. If both signals, the acoustic signal 130 and the electromagnetic signal 135, are signals from the calibration device 100, the detection section 260 determines a time difference between the time that the electromagnetic signal 135 and the acoustic signal 130 is received. The time of receipt of both signals is stored in memory. The detection section 260 deletes the reception time from memory 315, if the signal is not identified, as originating from the calibration device 100, i.e., unique key does not match. In another embodiment, if the acoustic signal 130 is a calibration signal, the timing difference is determined when the signature of the electromagnetic signal is not checked.

The detection section 260 outputs the time difference to the control section 265. The control section 265 can be a microprocessor. FIG. 2 illustrates that the detection section 260 as being separate from the control section 265; however, the two can be integrated.

The acoustic detector 110 also includes a notification section 270. The notification section 270 can be an LED or a speaker. The notification section 270 can used to indicate the setting of the time threshold and sensitivity. Additionally, the notification section 270 can be used as a confirmation of the receipt of the acoustic signal 130 or electromagnetic signal 135.

The acoustic detector 110 includes an internal power source 275 such as a battery. In another embodiment, the acoustic detector 110 can be powered via a wired power source from a security panel.

Figure 3:
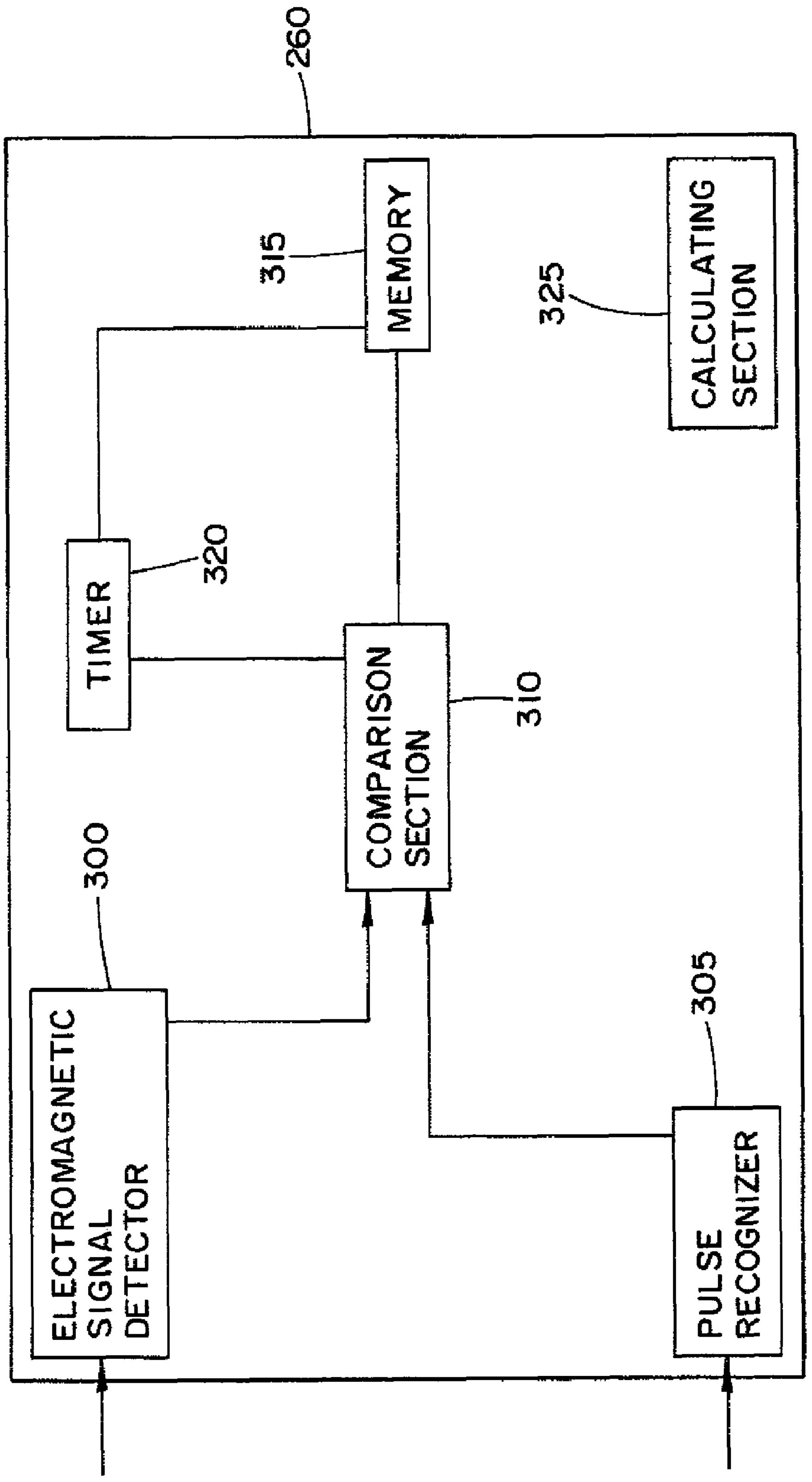
FIG. 3 illustrates a block diagram of the detection section of the acoustic detector in accordance with an embodiment of the invention.

FIG. 3 illustrates an exemplary detection section 260. The detection section 260 includes an electromagnetic signal detector 300, a pulse recognizer 305, a comparison section 310, memory section 315, at least one timer 320, and a calculating section 325.

The timer 320 is used to determine the reception time for the acoustic signal 130 and the electromagnetic signal 135. The reception time for both signals is stored in memory 315. The electromagnetic signal detector 300 is capable of detecting an electromagnetic signal such as the electromagnetic signal 135. The pulse recognizer 305 is adapted to determine a pattern of an acoustic signal such as timings of the pulses and amplitude. The pulse recognizer 305 includes an internal timing section (not shown) for determining the timing of the pulses. The comparison section 310 receives the detected electromagnetic signal from the electromagnetic signal detector 300 and the determined acoustic signal from the pulse recognizer 305, to determine if the signal originated from the calibration device 100. The comparison section 310 retrieves the unique key signature from the memory section 315 and determines if the unique key signature in the acoustic signal and electromagnetic signal match. If there is a match for both signals, the calculating section 325 will retrieve the reception time for both signals and determine the difference in the reception time. If one or both of the signals do not match, the reception timing for both signals will be deleted from memory 315. The calculating section 325 outputs the timing difference to the control section 265.

The control section 265 adjusts the sensitivity level, e.g., detection threshold of the acoustic detector 110 based on the timing difference. The control section includes a memory section 266. The memory section 266 contains a lookup table of detection thresholds and distances. A specific detection threshold corresponds to a preset distance range. For example, a first detection threshold can correspond to a distance range of 15-20 feet, whereas a second detection threshold can correspond to a distance range of 21-25 feet.

The control section 265 is configured to convert the determined timing difference into a corresponding distance. In one embodiment, the memory section 266 contains a conversion table. In another embodiment, the control section 265 will calculate the distance using the determined timing difference and the ratio of the speed of sound and the speed of an electromagnetic signal. Once the timing difference is converted into a distance, the control section 265 reads out the corresponding detection threshold from the memory section 266 and sets the corresponding detection threshold as the sensitivity level for the acoustic detector 110. The control section 265 will use the corresponding detection threshold as a basis for all future acoustic events.

Additionally, the control section 265 sets the predetermined time threshold using the determined timing difference. In an embodiment, the control section 265 will add a preset tolerance to the timing difference and set the new value as the time threshold. The time threshold will be used for all future verification of a glass break event.

Figure 4:
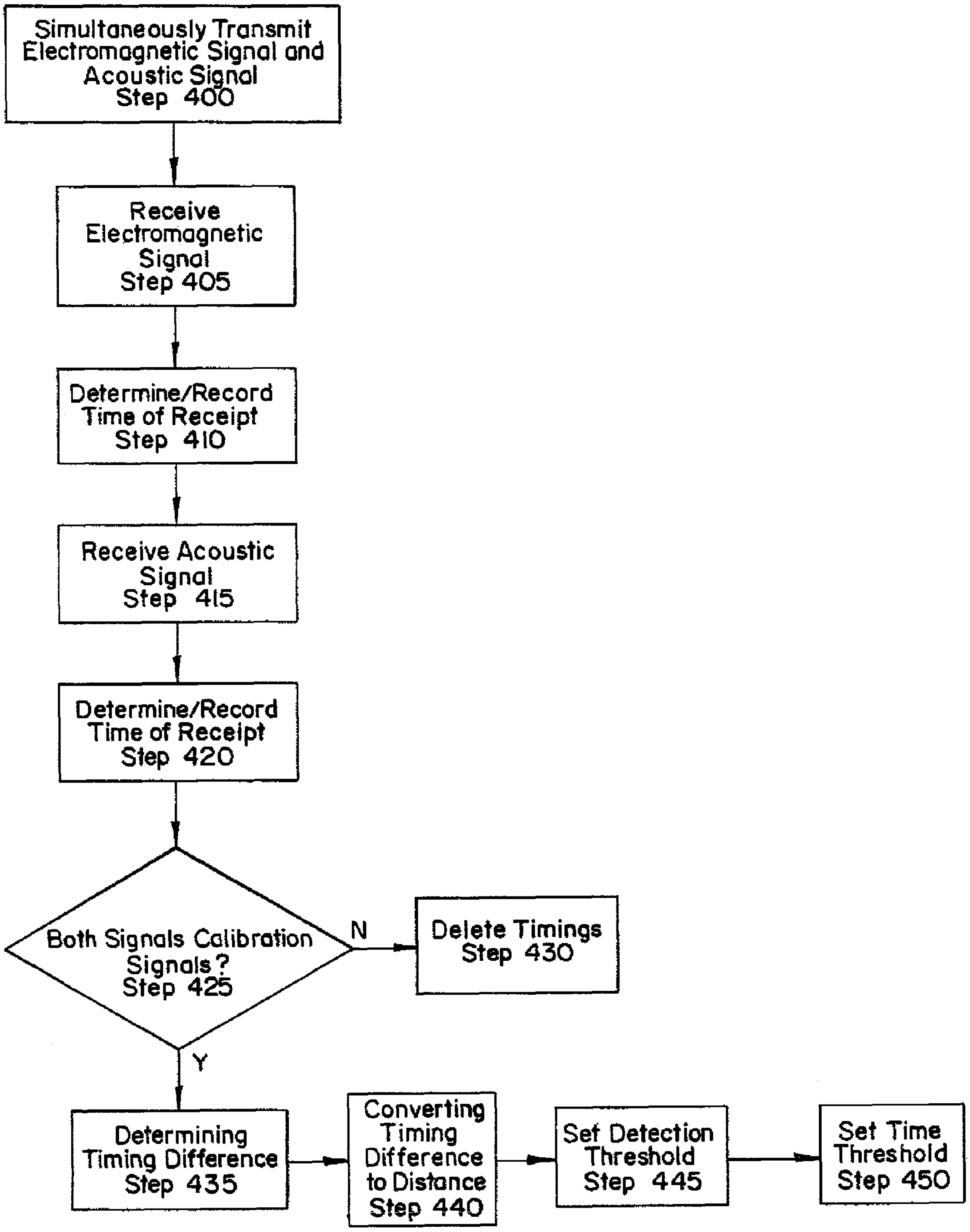
FIG. 4 illustrates a flow chart of the calibration method according to an embodiment of the invention.

FIG. 4 illustrates a flow chart of the calibration method according to an embodiment of the invention.

At step 400, calibration signals are simultaneously emitted, e.g., an acoustic signal 130 and an electromagnetic signal 135. The acoustic detector 110 receives the electromagnetic signal 135 first, as step 405. The acoustic detector 110 using timer 320 detects and records the reception time for the electromagnetic signal 135, at step 410. The reception time is stored in memory 315. The acoustic detector 110 receives the acoustic signal 130 second, at step 415. The acoustic detector 110 using timer 320 detects and records the reception time for the acoustic signal 135, at step 420.

At step 425, the acoustic detector 110 determines whether both signals originate from the calibration device 100. As described above, the detection section 260 determines if both signals include a unique key signature indicating that the signals originated from the calibration device 100. If either or both signals do not have the correct unique key signature, the recorded reception timings are deleted from memory 315, at step 430, and the process ends.

If both signals contain the correct unique key signature, e.g., the key signature prestored in memory 315 matches, a detected key signature, the acoustic detector 110, determines a timing difference, at step 435. The calculating section 325 retrieves the reception timings of the acoustic signal 130 and the electromagnetic signal 135 from memory 315 and subtracts the reception timings. The calculating section 325 then outputs the timing difference to the control section 265.

At step 440, the control section 265 converts the timing difference into a corresponding distance. In other words, the control section 265 determines the distance of the calibration device 110 from the acoustic detector 100. In an embodiment, the control section 265 calculates the distance using a ratio of the speed of sound to the speed of an electromagnetic signal. The speed of sound is 344 m/s (1238 km/h, or 769 mph, or 1128 ft/s). In an embodiment, a tolerance can be added/subtracted to the distance to account for humidity, height (above sea level) and temperature. In another embodiment, a conversion table is stored in memory 266. The control section 265 reads out the time/distance conversion from memory 266.

At step 445, the control section 265, using the distance value reads out a detection threshold from a table in memory 266. The detection threshold is set as the sensitivity level.

At step 450, the control section 265 sets the predetermined time threshold using the determined timing difference. The time threshold is stored in memory 266. The time threshold will be used by the acoustic detector 110 to verify glass break by determining if the sound of the broken glass is received within the predetermined time threshold from a signal from the impact sensor 115.

Figure 5:
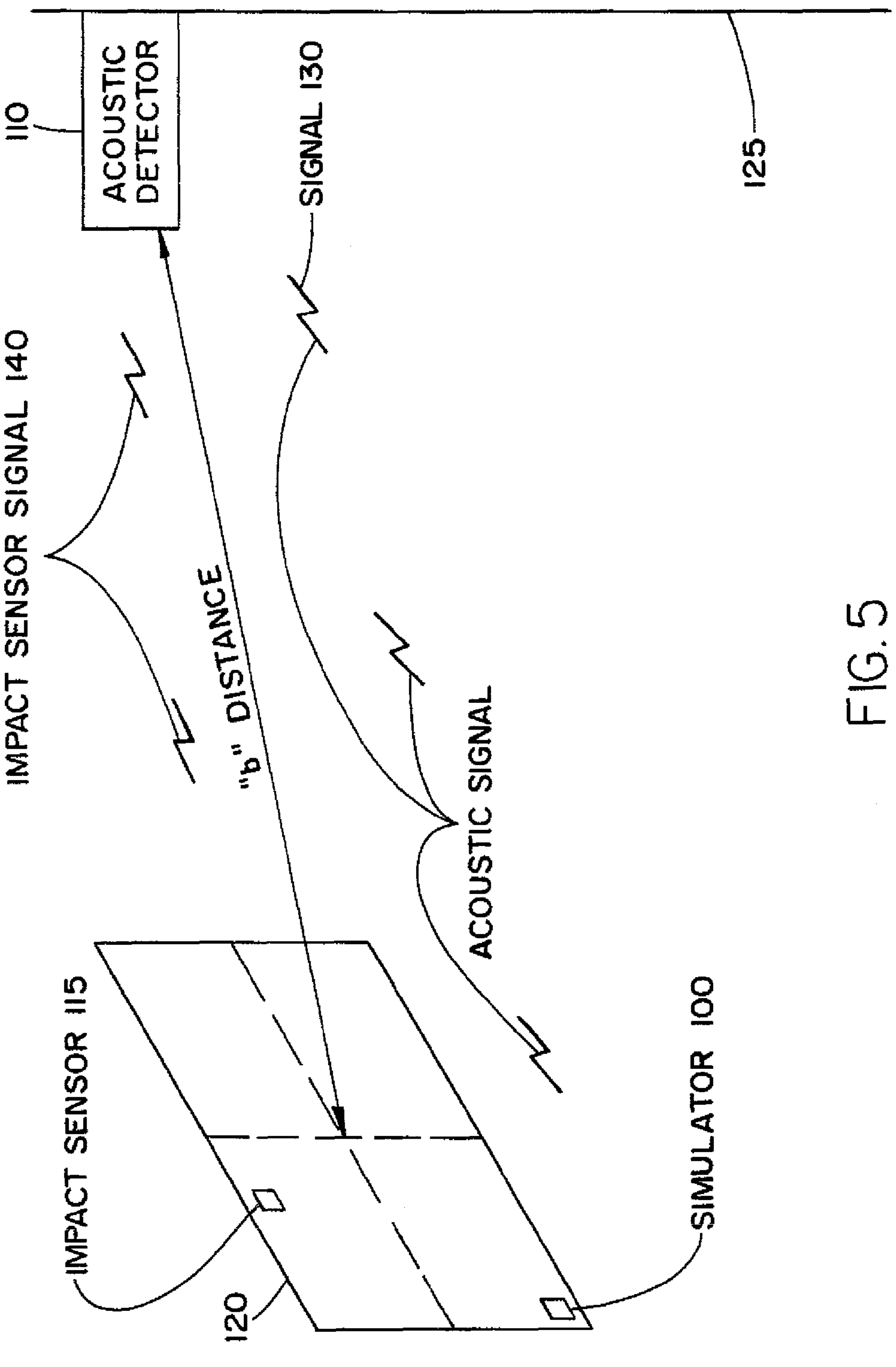
FIG. 5 illustrates a diagram glass breakage detection system and calibration system according to another embodiment of the invention.

By reference to FIGS. 5 and 6 description of another embodiment of the invention will be described. In this embodiment, instead of having the calibration device 100 simultaneously transmit the acoustic signal 130 and the electromagnetic spectrum signal 135 as calibration signals, the calibration device 100 will only transmit an acoustic signal 130. The impact sensor 115 will generate the other calibration signal, i.e. impact sensor signal 140. FIG. 5 illustrates that the impact sensor 115 is mount on a window 120. The simulator or calibration device 100 will be placed near the impact sensor 115. The user or installer will initiate the calibration process. Specifically, the installer will hit the glass window 120 with his/her hand to generating a mechanical impact on the glass window 120. The impact sensor 115 will detect the mechanical impact and generate the impact sensor signal 140, which is transmitted to the acoustic detector 110. Simultaneously, the calibration device 100 emits the acoustic signal 130. The calibration process in accordance with this embodiment is substantially same as depicted in FIG. 4 and will not be described again. One difference is that the impact sensor signal 140 will include a unique signature for the impact sensor 115 instead of the unique signature of the calibration device 100. Additionally, the acoustic detector 110 will only determine if the acoustic signal 130 contains a unique signature of the calibration device 100, i.e., at step 425. In other words, the acoustic detector 110 will only determined whether the acoustic signal 130 is a calibration signal. Furthermore, the acoustic detector 100 will process the impact sensor signal 140 as a calibration signal in place of the electromagnetic signal 135.

Figure 6:
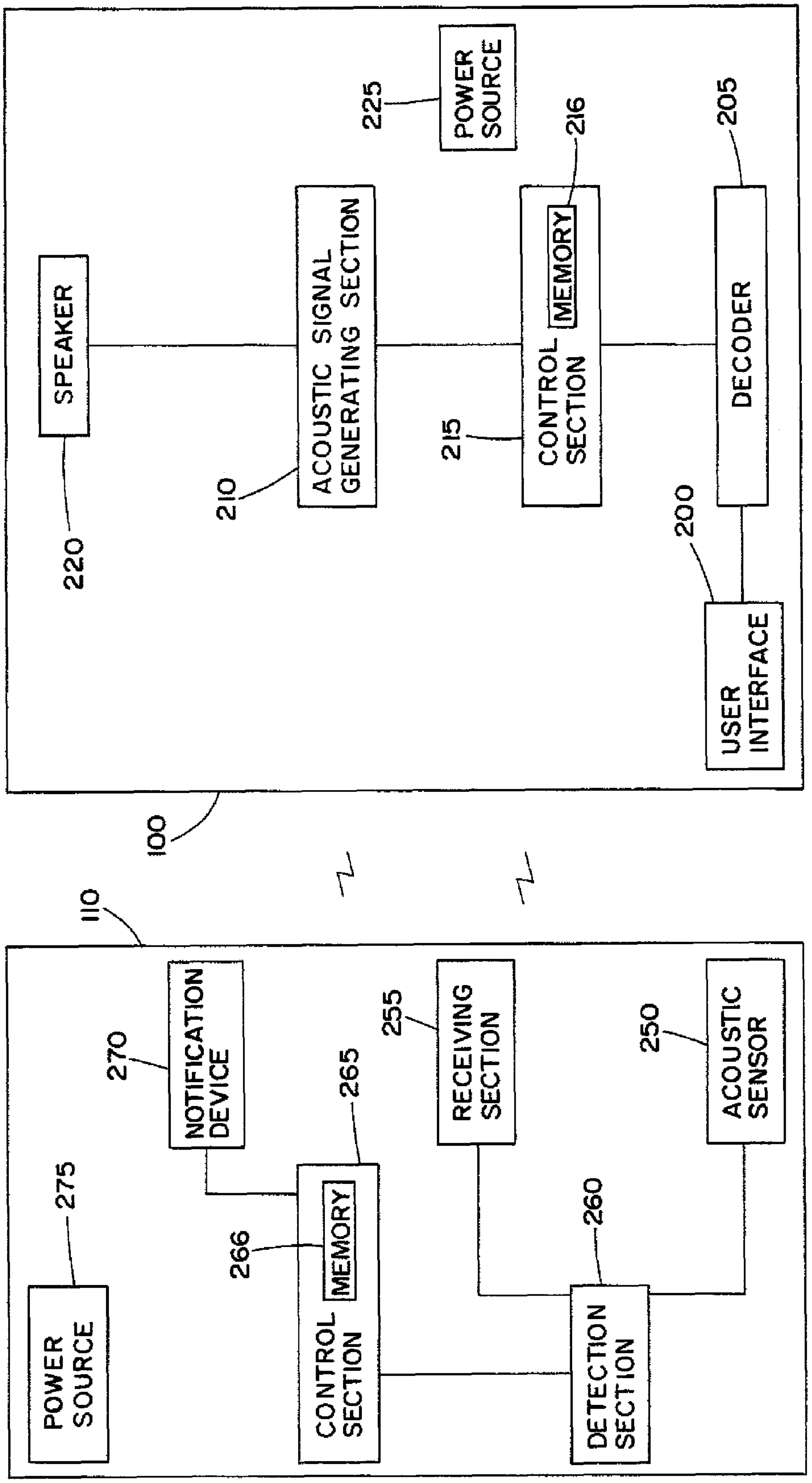
FIG. 6 illustrates a block diagram of a calibration device and an acoustic detector according to another embodiment of the invention.

FIG. 6 illustrates an acoustic detector 110 and calibration device 100 according to the above embodiment. Most of the elements and features of the acoustic detector 110 and calibration device 100 are the same as the previous embodiment except that the calibration device 100 in this embodiment does not include a transmission section 230. All of the other elements function is the same manner as described above and, therefore, will not be described again.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method of calibrating an acoustic detector comprising the steps of:
- encoding a unique key signature in an acoustic signal and an electromagnetic signal, the unique key signature identifies a calibration device;
- transmitting simultaneously the acoustic signal and the electromagnetic signal from the calibration device;
- receiving the electromagnetic signal at an acoustic detector;
- receiving the acoustic signal at the acoustic detector;
- detecting the unique key signature in the acoustic signal and in the electromagnetic signal for determining whether the signals are calibration signals;
- if the signals are calibration signals, then calculating a timing difference between the reception of the acoustic signal and electromagnetic signal; and
- storing the calculated timing difference as a first time threshold for determining if a glass panel is broken.

2. The method of calibrating an acoustic detector according to claim 1, further comprising the steps of:
- adding a preset tolerance value to the calculated timing difference; and
- storing a result of the addition as a second time threshold.

3. The method of calibrating an acoustic detector according to claim 1, further comprising the steps of:
- converting the calculated timing difference into a distance vector; and
- setting a detection threshold for a sensing element that corresponds to said distance vector.

4. The method of calibrating an acoustic detector according to claim 3, further comprising the steps of:
- adding a tolerance distance to the distance vector to generate an adjusted distance vector; and
- reading out the detection threshold from a table that corresponds to said adjusted distance vector.

5. The method of calibrating an acoustic detector according to claim 1, wherein said electromagnetic signal is a visible light signal.

6. The method of calibrating an acoustic detector according to claim 1, wherein said electromagnetic signal is an RF signal.

7. The method of calibrating an acoustic detector according to claim 1, wherein said electromagnetic signal is an infrared signal.

8. A calibration device for calibrating an acoustic detection system comprising:

a. an acoustic signal generating section for generating an acoustic signal having a unique signature corresponding to the calibration device;

b. a speaker for transmitting said acoustic signal to an acoustic detector;

c. a signal generating section for generating an electromagnetic signal having a second unique signature corresponding to the calibration device; and d. a transmitter for simultaneously transmitting the electromagnetic signal to the acoustic detector.

9. The calibration device according to claim 8, further comprising a user interface section for receiving a user input, said user input initiating the calibration of the acoustic detection system.

10. The calibration device according to claim 9, further comprising a control section for controlling the acoustic signal generating section, the speaker, the signal generating section and transmitter based upon the user input, said control section causing the speaker and transmitter to simultaneously transmit the acoustic signal and the electromagnetic signal to the acoustic detector.

11. The calibration device according to claim 10, wherein said control section includes;

a processor for controlling functionality of the calibration device;

a memory for storing the unique signature and digitized pulses of the acoustic signal; and a clock for maintaining an internal timing, said clock allowing the control section to cause the speaker and transmitter to simultaneously transmit the acoustic signal and the electromagnetic signal to the acoustic detector.

12. The calibration device according to claim 8, wherein said transmitter is a light emitting diode.

13. The calibration device according to claim 8, wherein said acoustic detection system includes an acoustic detector and an impact sensor.

14. An acoustic detector comprising:

a sensor for detecting an acoustic signal;

a receiver for detecting an electromagnetic signal;

a comparison section for detecting a unique signature in the acoustic signal for determining whether the acoustic signal is a calibration signal;

a timer for recording a reception time of the electromagnetic signal and a reception time of the acoustic signal if the acoustic signal is a calibration signal;

a calculating section for determining a timing difference between the reception times of the electromagnetic signal and the acoustic signal if the acoustic signal is a calibration signal; and a controller for storing the timing difference as a first time threshold if the acoustic signal is a calibration signal for determining if a glass panel is broken.

15. The acoustic detector according to claim 14, wherein the timer records the reception time upon receipt of a leading edge of the electromagnetic signal and a leading edge of a first pulse in the acoustic signal.

16. The acoustic detector according to claim 15, wherein said controller converts said time differences into a distance vector.

17. The acoustic detector according to claim 16, wherein said controller sets a detection threshold based upon said distance vector.

18. A system for calibrating an acoustic detector comprising:

an impact sensor for transmitting a signal to an acoustic detector; and a calibration device for encoding an acoustic signal with a unique signature that identifies that calibration device and simultaneously emitting the acoustic signal to the acoustic detector, wherein said acoustic detector determines a time of reception of the signal and the acoustic signal, determines if the acoustic signal includes the unique signature, and, if so, calculates a difference in the reception time of the signal and the acoustic signal and sets the difference as a first time threshold for determining if a glass panel is broken.

19. The system for calibrating an acoustic detector according to claim 18, wherein said acoustic detector determines a distance from a window to the acoustic detector based upon the difference and sets a sensitivity level for the acoustic detector based upon the distance.

* * * * *